United States Patent [19]
Matosic

[11] Patent Number: 5,255,955
[45] Date of Patent: Oct. 26, 1993

[54] SAFETY HEADREST FOR VEHICLES

[76] Inventor: Adam P. Matosic, 37 Nevins Rd., Methuen, Mass. 01844

[21] Appl. No.: 975,813

[22] Filed: Nov. 13, 1992

[51] Int. Cl.$^5$ ............................................. A47C 16/00
[52] U.S. Cl. ............................. 297/395; 297/DIG. 3; 5/644
[58] Field of Search .................... 5/644; 297/391, 395, 297/216, DIG. 3

[56] References Cited

U.S. PATENT DOCUMENTS

| | | | |
|---|---|---|---|
| 2,589,155 | 7/1952 | Smith | 297/391 |
| 3,644,949 | 2/1972 | Diamond | 5/644 X |
| 3,680,912 | 8/1972 | Matsuura | 297/391 |
| 4,031,578 | 6/1977 | Sweeney et al. | 5/644 X |
| 4,133,064 | 1/1979 | Petrusele | 5/644 |
| 4,919,483 | 4/1990 | Horkey | 297/395 |
| 5,054,855 | 10/1991 | Williams et al. | 297/395 |
| 5,123,704 | 6/1992 | Peterson | 297/395 |

*Primary Examiner*—Michael F. Trettel
*Attorney, Agent, or Firm*—Edward A. Gordon

[57] ABSTRACT

An improved safety impact headrest protector device which can be mounted to the inside of rear and side windows of vehicles including cabs, trucks, station wagons and the like for protecting the head of the driver and/or passenger(s) against injury. The safety impact headrest includes a cushion device having an overall six sided rectangular box-like configuration. The cushion device includes three triangular tubular members each formed of transparent flexible fluid impermeable material. The triangular tubular members include a rear equilateral configured tubular member including a back side and first and second angular sides; a first right angle configured tubular member with the elongated side member equal to and attached to the forward first angular side of the rear tubular member; and a second right angle configured tubular member with the elongated side member equal to and attached to the second angular side of the rear tubular member. A valve is attached to each of the three tubular members for controlling the amount of fluid pressure value in each tubular member. A fluid expelling device is attached to the upper surface of the rear center tubular member which provides for a selected amount of fluid to expire from the rear tubular member at a controlled exponential at the beginning of an impact upon the headrest protector device to protect the user's head. The headrest protector device includes an attaching device for attaching the headrest device in different locations and upon different surfaces.

23 Claims, 5 Drawing Sheets

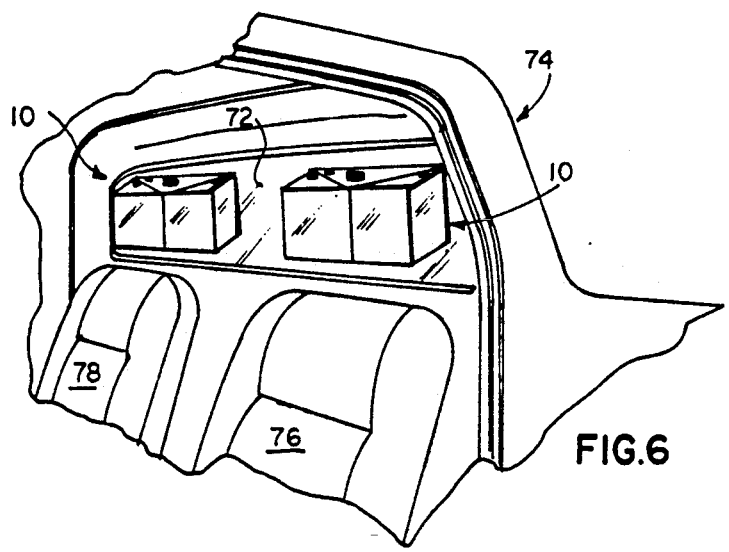
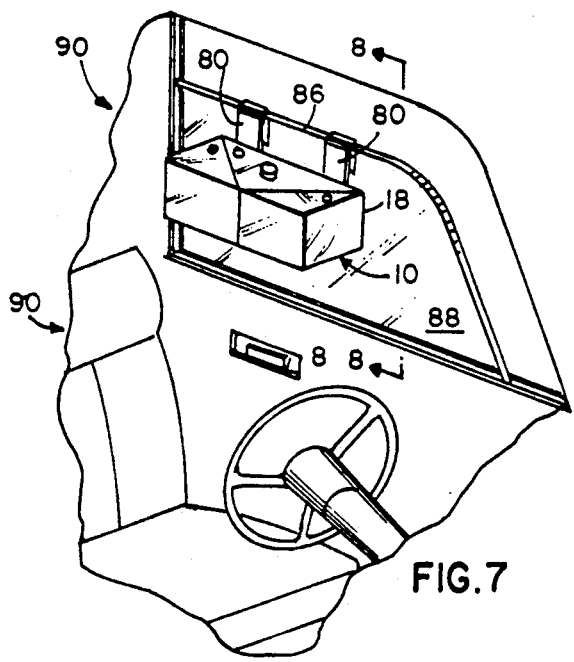
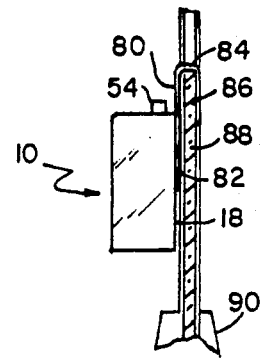
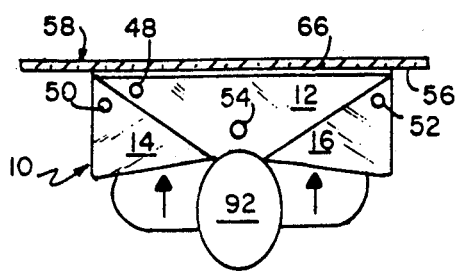
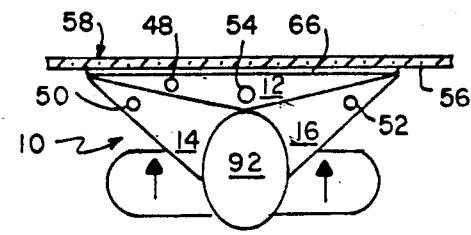

SAFETY HEADREST FOR VEHICLES

BACKGROUND OF THE INVENTION

1. Field Of The Invention

The present invention relates generally to headrests and more particularly to a new and improved headrest protector for drivers and passengers of motor vehicles and more particularly wherein the seat for the driver and passenger is slightly ahead of the rear window of the vehicle and which can also provide an unobstructed view therethrough.

2. Description Of Prior Art

Motor vehicles are routinely equipped with headrests typically mounted to the backs of the front and back seats in an adjustable holder that is built into the seat during manufacture. In certain vehicles such as trucks, vans, models having small cab fronts, and the back doors of station wagons, the passenger's and/or driver's head is positioned in close proximity to the rear window. Consequently, in case of a sudden stop, front or rear impact, or even sudden rear movement of the driver or passenger, the individual's head could impact the rear window in the absence of some form of protective device. Additionally, the passenger's and driver's head are also positioned in close proximity to the side windows. Consequently, in the case of a side impact, the individual's head could impact on the side window in the absence of some form of protective device.

Certain references of interest are concerned with headrests of one sort or another, yet none is believed to fulfill the above indicated needs.

The following U.S. patents are believed to exemplify the present state of the art with respect to headrests for vehicles.

U.S. Pat. No. 4,919,483 relates to a headrest for securing to the window in the cab of a truck, or to any supporting surface in other types of vehicles, employing a cushion of porous plastic material surrounded by a nonporous material. The cushion has a port extending through the casing and into the porous material. A valve is mounted on the casing to control air flow through the port upon head impact with the cushion and substantially closing the port upon inflow of air through the port and into the cushion after impact.

U.S. Pat. No. 4,880,275 relates to a cushion headrest in a vehicle comprising an elastic, foamed and resilient cushion body having a contoured face portion and a flat back portion wherein at least the face portion is covered by a finished surface and wherein the back portion carries a pressure sensitive, moisture activatable or heat activatable adhesive suitably protected by a removable coverstrip.

U.S. Pat. No. 4,838,575 relates to a head cushion support comprising a cushion support tray upon which the head cushion is carried, the cushion support itself being mounted on a vertically adjustable locking column. The locking column includes a medially disposed, locking joint and end members which are adapted to fit behind the window frame of a vehicle. A telescoping, adjustment piece is provided to extend or shorten the length of the locking column, and this adjustment piece enables the locking column to be properly sized for any given window.

U.S. Pat. No. 4,828,287 relates to a safety head protector for use in a pickup truck cab or other vehicle with a rear window immediately behind the occupant's head. The protector is made of a foam cushion mounted on a sturdy support and covered by an outer cover. The protector is mounted onto the rear window glass by fasteners which allow vertical position adjustment. The support behind the foam cushion acts to prevent the occupant's head from breaking the rear window glass, which the foam cushion alone would not.

Other prior art devices that are of general interest to show the state-of-the-art are disclosed in U.S. Pat. Nos. 5,054,855; 4,900,089; 4,807,933; 4,607,886; 4,440,443; and 3,220,770.

These prior art devices are not exhaustive but are exemplary of the state of the art which relates to headrest devices for vehicles.

While these prior art patents provide improvements in the areas intended, there still exists a great need for a new and improved safety headrest protector for drivers and passengers, which also provides an unobstructed view and which is relatively simple in construction.

Accordingly, a principle desirable object of the present invention is to provide a new and improved headrest protector for drivers and passengers of motor vehicles and more particularly wherein the seat for the driver and passenger is slightly ahead of a rear window of the vehicle and which overcomes the disadvantages of prior art headrests for vehicles.

Another desirable object of the present invention is to provide a new and improved headrest device for a driver or passenger in a vehicle, where the driver and/or passenger are positioned slightly ahead of the rear window of the vehicle.

A further desirable object of the present invention is to provide a safety headrest device which is visually transparent to maintain visibility through the window to which the headrest device is attached.

A still further desirable object of the present invention is to provide a detachable headrest which can be mounted on a vehicle's side window adjacent a driver and/or passenger and which is transparent in order to maintain side window visibility.

A still further desirable object of the present invention is to achieve the above desirable objects with an essentially simple structure lending itself to inexpensive mass production.

These and other desirable objects of the present invention will in part appear hereinafter and will in part become apparent after consideration of the specification with reference to the drawings and the claims.

SUMMARY OF THE INVENTION

The present invention discloses a new and improved safety headrest protector device which can be mounted to the inside of rear and side windows of vehicles including cabs, trucks, station wagons and the like for protecting the head of the driver and/or passenger(s) against injury. The safety impact headrest includes a cushion means having an overall six sided rectangular box-like configuration. The cushion means comprising three triangular tubular members each formed of transparent flexible fluid impermeable material. The triangular tubular members comprise a rear equilateral configured tubular member including a back side and first and second angular sides; a first right angle configured tubular member with the elongated side member equal to and attached to the forward first angular side of the rear tubular member; and a second right angle configured tubular member with the elongated side member equal to and attached to the second angular side of the rear tubular member. A valve means is attached to each of the three tubular members for controlling the amount of fluid pressure value in each tubular member. A fluid expelling means is attached to the upper surface of the rear center tubular member which provides for a selected amount of fluid to expire from the rear tubular member at a controlled exponential at the beginning of an impact upon the cushioning means. The headrest device of the present invention includes attaching means for releasably attaching the headrest device in different locations and upon different surfaces as described in detail hereinafter.

BRIEF DESCRIPTION OF THE DRAWINGS

For a fuller understanding of the nature and desired objects of the present invention, reference should be made to the following detailed description taken in conjunction with the accompanying drawings wherein like reference characters denote corresponding parts throughout several views and wherein:

FIG. 6 is a fragmentary perspective view of a cab-type vehicle showing two safety headrest devices of the present invention mounted on the inner side of the rear window for a driver and passenger;

FIG. 7 is a fragmentary perspective view of a safety headrest device of the present invention attached to the driver's left side window of a vehicle;

FIG. 8 is a cross-sectional view taken along the line 8—8 of FIG. 7;

FIG. 9 is a fragmentary top perspective view illustrating the impact of a driver's or passenger's head on the safety headrest device embodying the present invention; and FIG. 9A is a fragmentary top perspective view illustrating the conformity of the safety headrest device of FIG. 9 with further penetrations of the occupant's head.

DETAILED DESCRIPTION OF PREFERRED EMBODIMENT(S)

Figure 1:
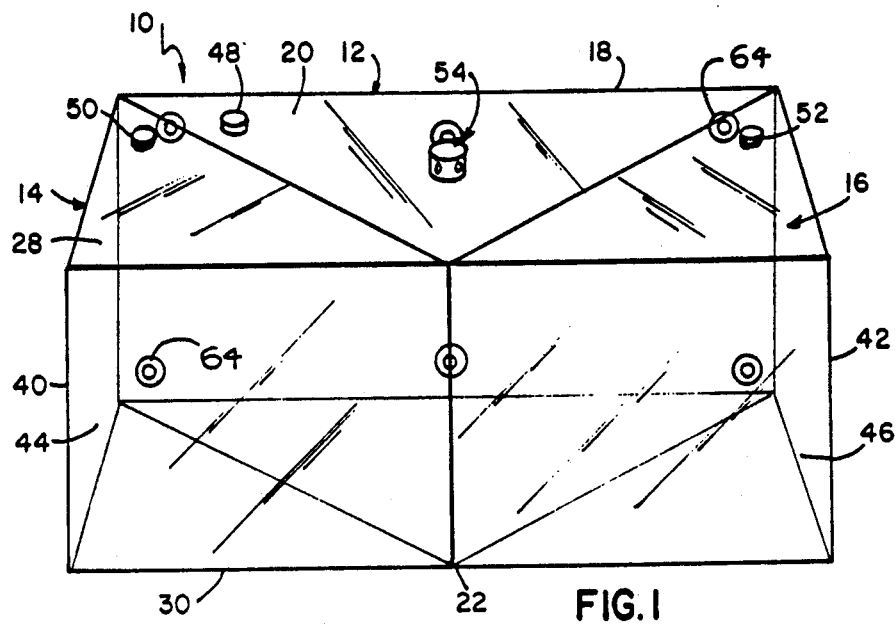
FIG. 1 is an enlarged front and slightly upper and side perspective view of a safety headrest device in accordance with the present invention.
Figure 2:
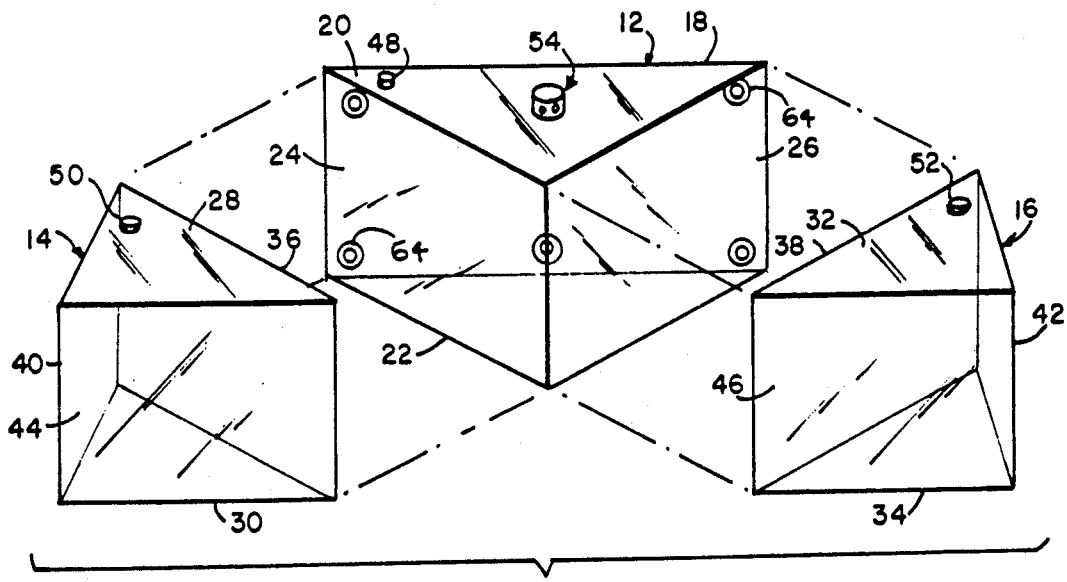
FIG. 2 is an exploded front perspective view of the safety headrest device of FIG. 1

Referring now to the drawings and more particularly to FIGS. 1-4, there is illustrated an embodiment of a safety impact headrest device for vehicles embodying the principles of the present invention. As illustrated, the safety headrest device comprises a cushion means indicated generally by the numeral 10, having an overall six sided rectangular box-like configuration. The impact cushion means 10 includes three triangular tubular members 12, 14 and 16 each formed of transparent flexible fluid impermeable material such as, for example, clear transparent polyethylene or polycarbonate.

The triangular tubular member 12 has a equilateral triangular configuration including a rectangular vertical planar back surface member 18, upper and lower horizontal equilateral surface members 20 and 22, and angular vertical side surface members 24 and 26. The triangular tubular members 14 and 16 each include upper and lower horizontal right angle surface members 28, 30 and 32, 34; rear rectangular vertical surface members 36 and 38 which each correspond in size respectively to the side surfaces 24 and 26 of the rear tubular member 12; respective vertical side surface members 40 and 42; and respective front vertical surface members 44 and 46.

Figure 2A:
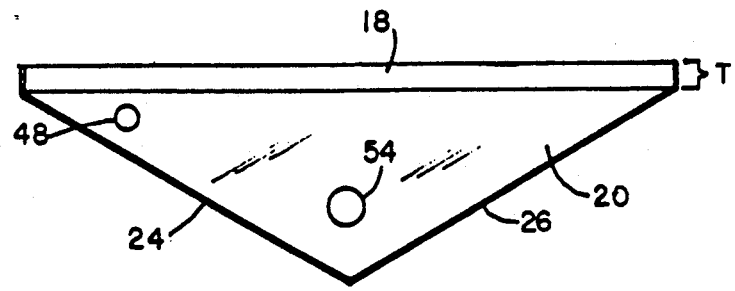
FIG. 2A is a top plan of an alternate embodiment of the rear triangular tubular member of FIGS. 1 and 2.

As illustrated in FIG. 2A, the thickness of the area T of the rectangular vertical back surface member 18 is increased to one inch, for example. This provides further protection of the occupant with respect to the glass window to which the cushion means 10 is attached.

The tubular members 12, 14 and 16 are each respectively provided with conventional fluid valve means 48, 50 and 52 preferably attached to the upper surfaces of the tubular members for controlling the amount of fluid, such as air for example, to be inserted for inflation or removed to reduce the pressure or evacuate the fluid. The rear tubular member 12 is also provided with a fluid expelling reducing valve means 54 attached to the upper surface 20 of the rear tubular member 12. The fluid reducing valve means 54 is constructed and arranged to expel a portion of the compressed air, for example, therein during a given force of impact by the head of the driver, for example, when the vehicle is struck at the rear. In this manner the air reducing valve means 54 expels a certain amount of compressed air based upon a given force of impact of the occupant's head at a progressive rate and amount to prevent rupture of the tubular member 12 and to provide a partial deflation in an exponential rate to a given force from the occupant's head to thereby protect the occupant's head as discussed later with respect to FIG. 9.

Figure 1A:
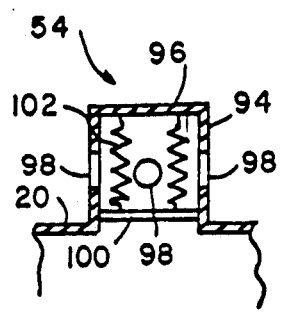
FIG. 1A is a fragmentary cross-sectional view of the reducing valve 54 of FIG. 1 in a closed position.

As illustrated in FIG. 1A, the fluid reducing valve means includes a vertical cylindrical chamber section 94 having the top cover section 96. The bottom portion of the chamber section is attached to the upper surface 20 of the tubular member 12. Hole openings 98 are positioned about the lower portion of the chamber section 94 adjacent the surface 20. Positioned within the chamber 94 is a circular seal member 100 which is attached below the hole members 98 by the spring means 102. In this position the fluid such as air is maintained within the tubular member 12 under normal conditions when there is no impact against the cushion means 10.

Figure 3:
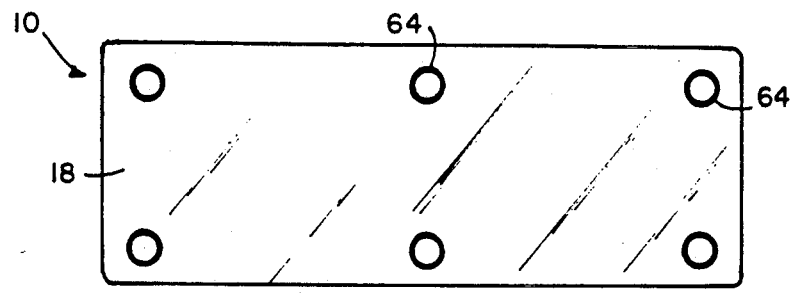
FIG. 3 is a back view of the safety headrest shown in FIG. 1 with adhesion members attached thereto.
Figure 4:
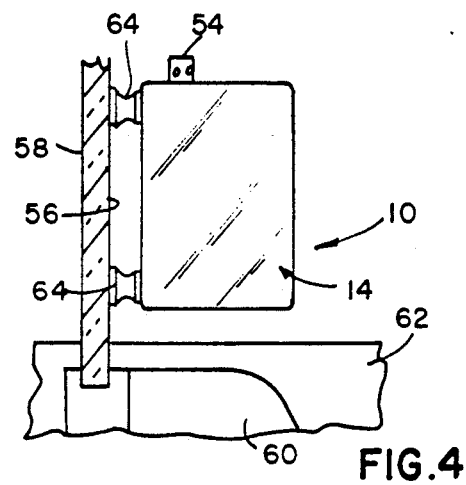
FIG. 4 is a fragmentary sectional view of the safety headrest device of FIG. 3 illustrating its attachment to the window of a vehicle.

As best seen in FIGS. 3 and 4, there is illustrated one embodiment of means for attaching the safety tubular headrest cushion means 10 to the inner surface 56 of the rear window 58 adjacent the seat 60 of a vehicle 62. In this embodiment, the attaching means 64 are suction cups which are sealed normally or by glue, for example, to the back surface member 18 of the tubular member 12. The suction cups 64, which are preferably formed of transparent plastic material, are attached to the inner surface 56 of the rear vehicle window 58.

Figure 5:
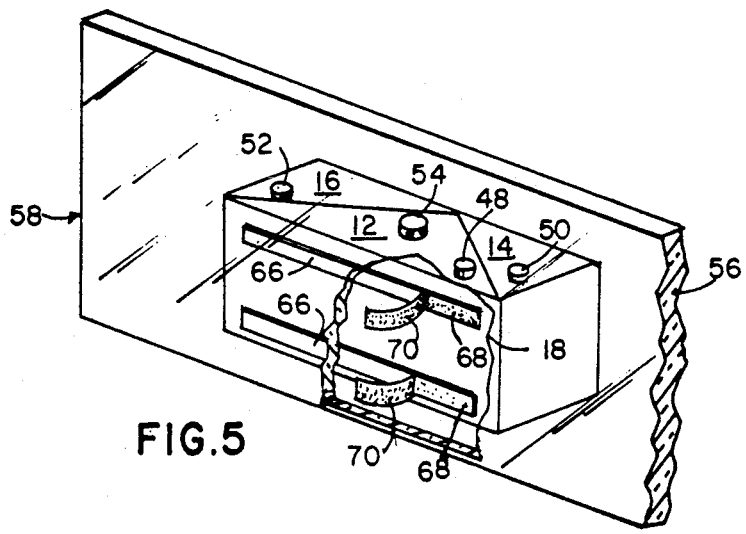
FIG. 5 is an enlarged fragmentary perspective view of the headrest device of FIG. 1 attached to a vehicle window by means of hook and loop fastener strips.

Referring now to FIG. 5, there is illustrated another embodiment for attaching the safety tubular headrest cushion means 10 to the inner surface 56 of the rear window 58. In this embodiment, the headrest cushion means 10 is attached by two hook and loop fastener strips 66 sold under the trademark VELCRO, each including the two mating strips 68 and 70 with strips 68 each attached to the back surface member 18 and strips 70 each attached to the inner surface 56 of the window 58. While the VELCRO strips 66 are shown as attached horizontally, they may be attached vertically within the scope of the present invention. While additional VELCRO strips can be employed, the two strips are preferred so that the transparent see through feature of the headrest cushion means 10 of the present invention is not substantially reduced or obstructed. It has been found that two sealing strips such as VELCRO strips 66 maintain an unobstructed viewing through the headrest cushion means 10 and through the rear window means 58, for example.

Figure 5A:
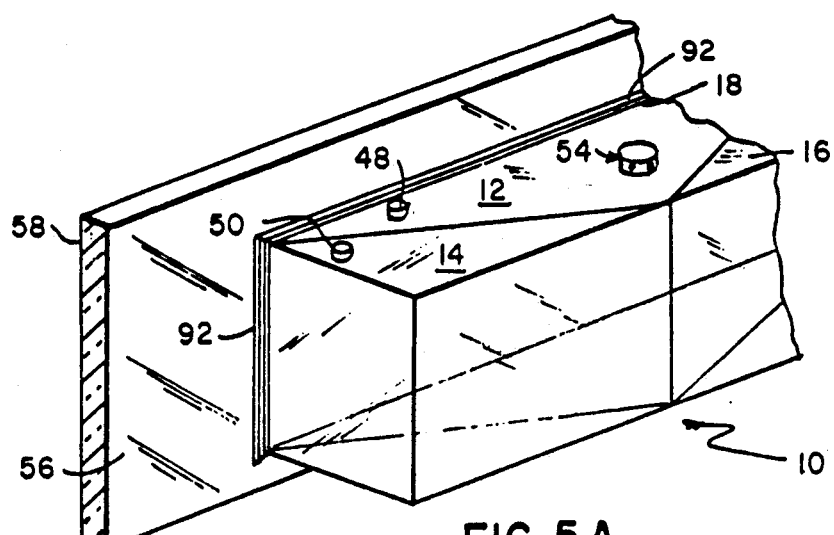
FIG. 5A is an alternate embodiment of an attachment of the headrest device of the present invention to a vehicle window.

FIG. 5A shows another embodiment for attaching the safety tubular headrest cushion means 10 to the inner surface 56 of the rear vehicle window 58 in which the back surface 18 of the tubular member 12 is attached by a transparent adhesive material 92 such as a magnetic strip, glue, mastic or other transparent adhesive material.

Referring now more particularly to FIG. 6, there is illustrated two detachable tubular headrest cushion means 10 each mounted entirely on the interior surface of the rearview window 72 of a cab-type vehicle 74. As shown, one headrest cushion 10 is located just rearwardly of the driver's seat 76 and the other headrest cushion 10 located just rearwardly of the passenger seat 78. In this example the headrest cushions 10 are attached to the rear window by VELCRO strips as described with respect to FIG. 5, for example. As described previously, the headrest cushions 10 are formed of clear transparent plastic material which is see-through whereby the driver and passenger have an unobstructed viewing through the headrest cushion devices 10 and thereby through the rearview window 72. This feature of the present invention also permits the driver to view through the headrest cushion device 10 and the rear window 72 when turned and looking rearwardly and when viewing the conventional vehicle rearview mirror, not shown.

FIGS. 7 and 8 illustrate a modification of the safety headrest cushion means 10 wherein the headrest cushion means 10 is similar as discussed in FIGS. 1-6 except that the attaching means comprises two transparent plastic strap members 80 which each have a lower portion 82 which are sealed preferably to each end of the back surface 18 of the headrest cushion means 10. The upper surface of each of the strap members 80 are provided with a U-shaped section 84 which can be inserted over the upper end 86 of the side door window 88 of the vehicle 90. In this embodiment, the headrest cushion device 10 serves in the same manner as discussed with respect to the rear windows but permits the window to be opened to a certain extent as desired. The side window cushion means 10 of the present invention is particularly useful in vehicles which are used in racing or contact actions.

In contradistinction to the prior art, the present invention provides a new and improved headrest cushion protector device which is attachable to a vehicle's rear window and/or side window and is thus positioned between the person's head and the exposed selected window of a vehicle.

Figure 1B:
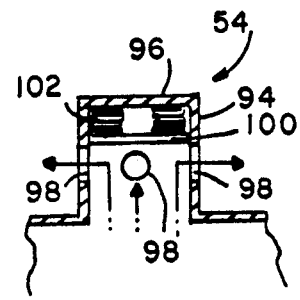
FIG. 1B is a fragmentary cross-sectional view of the reducing valve 54 of FIG. 9 in the opening position.

Referring now more particularly to FIGS. 9 and 9A, the oblong safety headrest cushion device 10 as described herein is designed so that when in position such as illustrated in FIGS. 5 and 6, and in the event of the occupant's head 92 contacting the inflated three chambered cushions, the first action is that the middle chamber 12 will deform (after a given force) as necessary; and so that none of the three chambers 12, 14 and 16 ruptures. When the occupant's head 92 impacts the cushion device 10 as illustrated in FIGS. 9 and 9A the occupant's head 92 forces air under pressure against the seal member 100, as illustrated in FIG. 1B, which forces the seal member up above the holes 98 which then causes some of the air in the tubular member 12 to vent into the atmosphere resulting in partial deflation of the tubular member 12. Accordingly, the safety reducing valve means 54 will release air to reduce built up pressure at a controlled rate relative to the impact thereby accommodating deceleration for the desired effect. Due to the two right angle triangular tubular members 14 and 16 on either side, the partial deflation of the rear middle tubular member 12 allows and actually pulls both side tubular members 14 and 16 toward the center of the safety headrest cushion means 10 and thereby acts to center the occupant's head 92, which is thereby being cradled and supported by the two tubular members 14 and 16 in the middle of the cushion 10; meanwhile, this provides a safety area with two cushions relying on their shear bursting strength at the end of the head movement. As best seen in FIG. 9A, this final action happens when the rear center tubular member 12 has expelled, for example, approximately up to two thirds of its volume of air and the body of accelerated mass has conformed and penetrated the safety rear and center front tubular member 12 approximately two thirds in depth. The two side tubular members 14 and 16 move about the sides of the occupant's head 92 and maintain the occupant's head 92 in the center of the headrest cushion device 10 and provide a safety cushioning effect upon impact of the occupant's head.

The cushion means 10 of the present invention operates in a similar manner on the side windows. Additionally, it is to be understood that while one of the principle features of the present invention is a transparent safety impact headrest device, a non-transparent headrest device is also included where a transparent feature is not required.

Figure 10:
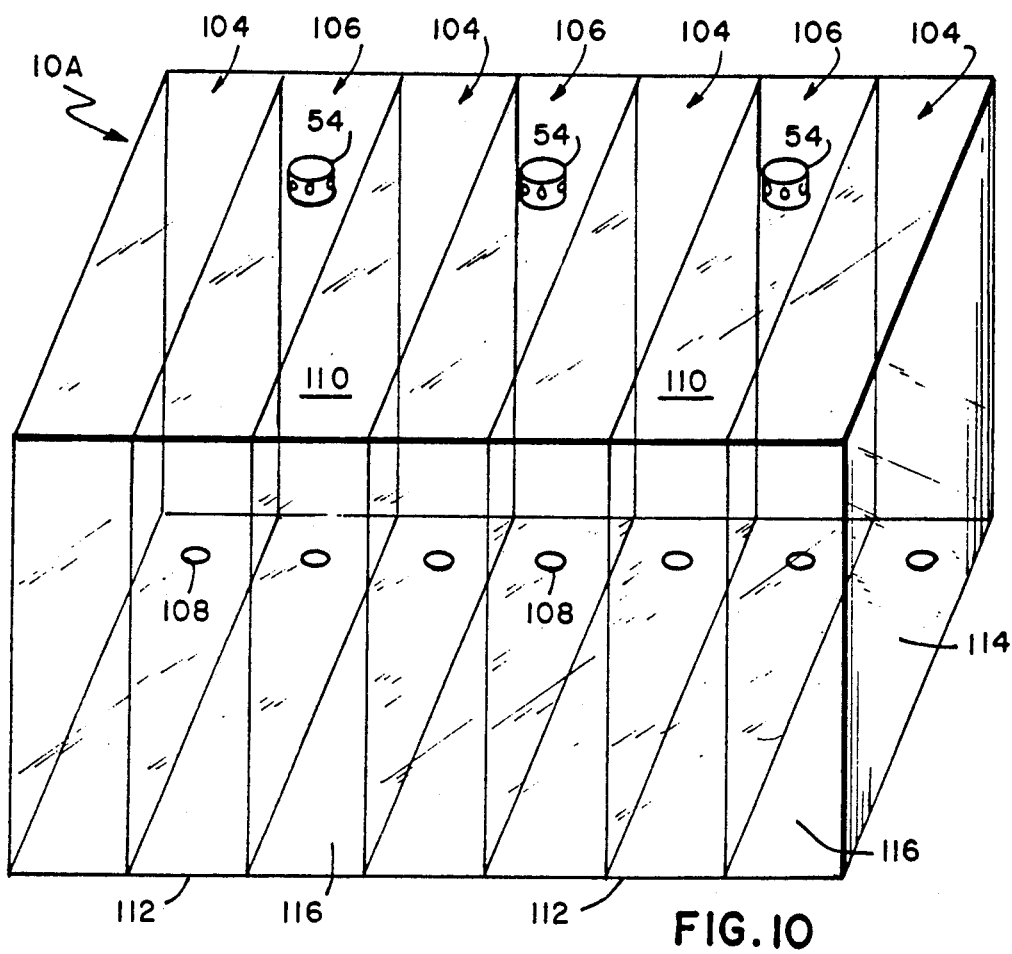
FIG. 10 is a perspective view of a second embodiment of the headrest device.

Another embodiment of this invention is demonstrated in FIG. 10 wherein the cushion means indicated generally by the numeral 10A includes a plurality of preferably vertical rectangular shaped tubular chamber members 104 and 106. As illustrated in this embodiment, the total tubular members are seven which begins and ends with a tubular member 104. The alternate tubular member 106 is provided with safety fluid reducing valve means 54 attached to the upper surface 110 of each of the tubular members 106. Each of the tubular members 104 and 106 are provided with similar conventional fluid valve means 108 for adding fluid such as air into the tubular members 104 and 106 which are preferably attached to the bottom surfaces 112 of the tubular members 104 and 106 and preferably adjacent to the rear vertical surfaces 114 of each of the tubular members 106 and 108.

Figure 11:
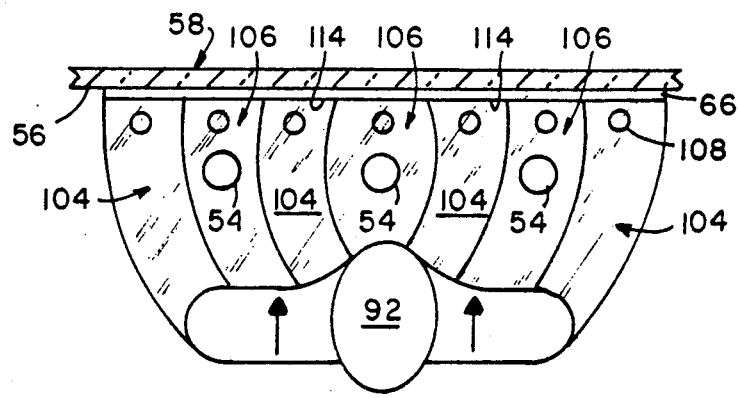
FIG. 11 is a top view of the second embodiment of the headrest device.

Referring now to FIG. 11, the oblong safety headrest cushion device 10A is attached to the inner surface 56 of the rear window 58 by VELCRO strips 66 as described with respect to FIG. 5. As illustrated, the cushion means 10A operates in a manner similar to the cushion means 10 as described with respect to FIGS. 9 and 9A. When the occupant's head 92 is caused to impact the cushion device means 10A against the front surfaces 116 of the tubular members 104 and 106, the occupant's head 92 forces against the contained fluid, such as air, whereby the reducing valve means 54 causes some of the air in the tubular members 106 to vent into the atmosphere resulting in partial deflation of the tubular members 106 which contain the fluid reducing valve means 54. As indicated in FIG. 11, the center tubular member 106 receives a greater impact than the side positioned tubular members 106 whereby the greater insertion of the center tubular member 106 pulls both side tubular members 104 toward each side of the occupant's head. In the same manner, each of the alternate side tubular member 106 is caused to have some air vented resulting in partial deflation, depending on the force of impact whereby they are compressed and thereby pull the adjacent other tubular members 104 toward the sides of the occupant's head 96 to thereby provide protection. It is to be understood that the greater the impact, the greater deflation and compression of the tubular members 106 whereby the spaced tubular members 104 move further inward and about the sides of the occupant's head 92 and thereby maintain the occupant's head 92 in the center of the headrest cushion device 10A and provide a safety cushioning effect upon impact of the occupant's head.

It is to be understood that the number of alternate tubular members 104 and 106 can be varied as well as the size to comply with the particular desired use.

While the invention has been described with respect to preferred embodiments, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in limiting sense.

What is claimed is:

1. A safety impact headrest device for a vehicle comprising: a cushion means;
   said cushion means comprising three inflatable triangular tubular members formed of flexible fluid impermeable material;
   said triangular tubular members comprising; a rear center tubular member including a back side and first and second forward angular sides; a first triangular configured tubular member with one side equal to and attached to the first angular side of the rear tubular member; and a second triangular configured tubular member with one side equal to and attached to the second angular side of the rear tubular member;
   a valve means attached to each of said tubular members for controlling the amount of fluid pressure value in the tubular member; and
   a fluid expelling means attached to an upper surface of the rear center tubular member whereby a selected amount of fluid is expired from the rear center tubular member at a controlled rate upon an impact upon the cushioning means.

2. The safety impact headrest device according to claim 1 wherein the flexible fluid impermeable material is transparent.

3. The safety impact headrest device according to claim 2 wherein said flexible fluid impermeable transparent material comprises a plastic material.

4. The safety impact headrest device according to claim 1 including fastening means for releasably attaching said headrest device to a window of a vehicle.

5. The safety impact headrest device according to claim 4 wherein said fastening means are suction cups.

6. The safety impact headrest device according to claim 4 wherein said fastening means is transparent.

7. The safety impact headrest device according to claim 1 for a cab type vehicle having a front seat and a rear cab glass window adjacent to the upper portion of said seat, wherein said headrest device is releasably attached to said window and inflated with transparent fluid.

8. The safety impact headrest device according to claim 1 wherein said three triangular tubular members form an overall six sided rectangular box-like configuration.

9. The safety impact headrest device according to claim 1 wherein the back side of the rear tubular member includes transparent hook fastening means for interlockingly attaching over the upper end of a side door window of a vehicle.

10. The safety impact headrest device according to claim 1 wherein the fluid expelling means comprises a reducing valve means.

11. A safety impact head rest device comprising:
    a cushion means;
    said cushion means comprising three inflatable triangular tubular members formed of transparent flexible air impermeable material;
    said three triangular tubular members being attached to each other to thereby form an overall six sided rectangular box-like configuration;
    said triangular tubular members comprising; a rear equilateral configured tubular member including a back side and first and second angular sides; a first right angle configured tubular member with the elongated side equal to and attached to the first angular side of the rear tubular member; and a second right angle configured tubular member with the elongated side equal to and attached to the second angular side of the rear tubular member;
    a valve means attached to each of said tubular members for controlling the amount of air pressure value in the tubular member; and
    a reducing valve means attached to an upper surface of the rear tubular member whereby a selected amount of air is expired from the rear tubular member at a controlled exponential at the beginning of an impact upon the cushioning means.

12. A safety impact headrest device comprising:
    a cushion means;
    said cushion means comprising three inflatable triangular tubular members formed of transparent flexible air impermeable material;
    said three triangular tubular members being attached to each other to thereby form an overall six sided rectangular box-like configuration;
    said triangular tubular members comprising; a rear equilateral configured tubular member including a back side and first and second angular sides; a first right angle configured tubular member with the elongated side equal to and attached to the first angular side of the rear tubular member; and a second right angle configured tubular member with the elongated side equal to and attached to the second angular side of the rear tubular member;

a valve means attached to each of said tubular members for controlling the amount of air pressure value in the tubular member; and a reducing valve means attached to an upper surface of the rear tubular member for controlling the amount of air expelled from said rear tubular member upon an impact compression force being applied to said cushioning means by an occupant's head;

said reducing valve means opening upon initial impact to permit a relative amount of air to expel from said rear tubular member and rapidly closing after impact whereby the partial deflation of the rear middle tubular member pulls both of said side tubular members toward the center of the cushion means to retain the occupant's head therein.

13. The safety impact headrest device according to claim 12 wherein said flexible fluid impermeable transparent material comprises a plastic material.

14. The safety impact headrest device according to claim 12 including fastening means for releasably attaching said headrest device to a window of a vehicle.

15. The safety impact headrest device according to claim 14 wherein said fastening means are suction cups.

16. The safety impact headrest device according to claim 14 wherein said fastening means is transparent.

17. The safety impact headrest device according to claim 12 wherein the back side of the rear tubular member includes transparent hook fastening means for interlockingly attaching over the upper end of a side door window of a vehicle.

18. A safety impact headrest device comprising:
a cushion means;
said cushion means comprising a plurality of inflatable vertical rectangular shaped tubular members formed of transparent flexible air impermeable material;

said rectangular tubular members being attached to each other by their vertical sides to thereby form an overall rectangular box-like configuration;

a valve means attached to each of said tubular members for controlling the amount of air pressure value in the tubular member; and a reducing valve means attached to an upper surface of each alternate tubular member for controlling the amount of air expelled from said alternate tubular members upon an impact compression force being applied to said cushioning means by an occupant's head;

said reducing valve means opening upon initial impact to permit a relative amount of air to expel from said alternate tubular members having reducing valve means and rapidly closing after impact whereby the partial deflation of the alternate tubular members having reducing valve means pulls the adjacent tubular members which have no reducing valve means toward the center of the cushion means to retain the occupant's head therein.

19. The safety impact headrest device according to claim 18 wherein said flexible air impermeable transparent material comprises a plastic material.

20. The safety impact headrest device according to claim 18 including fastening means for releasably attaching said headrest device to a window of a vehicle.

21. The safety impact headrest device according to claim 20 wherein said fastening means are suction cups.

22. The safety impact headrest device according to claim 20 wherein said fastening means is transparent.

23. The safety impact headrest device according to claim 18 wherein the back side of the cushion means includes transparent hook fastening means for interlockingly attaching over the upper end of a side door window of a vehicle.

* * * * *